(12) United States Patent
Colombiès

(10) Patent No.: US 11,958,599 B2
(45) Date of Patent: Apr. 16, 2024

(54) SUPPORTING STRUCTURE WITH PASSIVELY ADAPTABLE PROFILE

(71) Applicant: Guilhem Colombiès, Calamane (FR)

(72) Inventor: Guilhem Colombiès, Calamane (FR)

( * ) Notice: Subject to any disclaimer, the term of this patent is extended or adjusted under 35 U.S.C. 154(b) by 100 days.

(21) Appl. No.: 17/427,675

(22) PCT Filed: Feb. 3, 2020

(86) PCT No.: PCT/EP2020/052647
§ 371 (c)(1),
(2) Date: Aug. 2, 2021

(87) PCT Pub. No.: WO2020/157341
PCT Pub. Date: Aug. 6, 2020

(65) Prior Publication Data
US 2022/0126979 A1    Apr. 28, 2022

(30) Foreign Application Priority Data
Feb. 1, 2019   (FR) ........................................ 1900981

(51) Int. Cl.
*B64C 3/44* (2006.01)
*B64C 3/18* (2006.01)
*B64C 3/30* (2006.01)
*B64C 3/52* (2006.01)

(52) U.S. Cl.
CPC ................ *B64C 3/44* (2013.01); *B64C 3/182* (2013.01); *B64C 3/30* (2013.01); *B64C 3/52* (2013.01); *B64C 2003/445* (2013.01)

(58) Field of Classification Search
CPC .... B64C 3/44; B64C 3/46; B64C 3/48; B64C 3/52; B64C 2003/445
See application file for complete search history.

(56) References Cited

U.S. PATENT DOCUMENTS

| 1,341,758 A * | 6/1920 | Parker ...................... B64C 3/48 |
| | | 244/219 |
| 2011/0042524 A1 | 2/2011 | Hemmelgarn et al. |
| 2014/0302261 A1 | 10/2014 | Cheung |
| 2018/0043639 A1* | 2/2018 | Autry ....................... B64C 1/14 |

(Continued)

FOREIGN PATENT DOCUMENTS

| EP | 2965985 A1 | 1/2016 |
| EP | 3287363 A1 | 2/2018 |

OTHER PUBLICATIONS

International Search report issued in PCT EP2020/052647 dated Apr. 30, 2020, 7 pages.

(Continued)

*Primary Examiner* — Nicholas McFall
(74) *Attorney, Agent, or Firm* — Pearne & Gordon LLP

(57) ABSTRACT

The invention relates to a supporting structure (46) which is positioned in a fluid flow (44) and characterised in that it is configured to be elastically deformed, on at least one portion of the supporting structure (46), between a first idle state in the absence of external stress and a second deformed state in the presence of external stresses caused by the fluid flow (44) due to a change in the orientation of the supporting structure (46) and/or the fluid flow (44). The invention also relates to an aircraft comprising at least one such supporting structure (46).

16 Claims, 14 Drawing Sheets

(56) References Cited

U.S. PATENT DOCUMENTS

2019/0360510 A1* 11/2019 Broers .................. B32B 15/08

OTHER PUBLICATIONS

Barlas, et al. "Review of state of the art in smart rotor control research for wind turbines." Progress in Aerospace Sciences, vol. 46 (2010). Sep. 15, 2009. pp. 1-27.

Thill, et al. "Morphing Skins." Advanced Composites Centre for Innovation and Science (ACCIS), Aeronautical Journal Royal Aeronautical Society, vol. 112, No. 1129. Paper No. 3216. Mar. 2008. 28 pages.

Parker, H. F. "The Parker Variable Camber Wing." National Advisory Committee for Aeronautics. Dec. 31, 1920. 44 pages (resubmission of legible copy).

* cited by examiner

[Fig. 1]
--PRIOR ART--
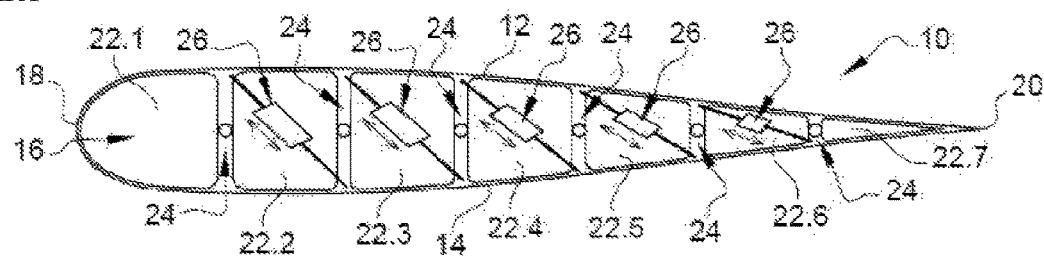

[Fig. 2]
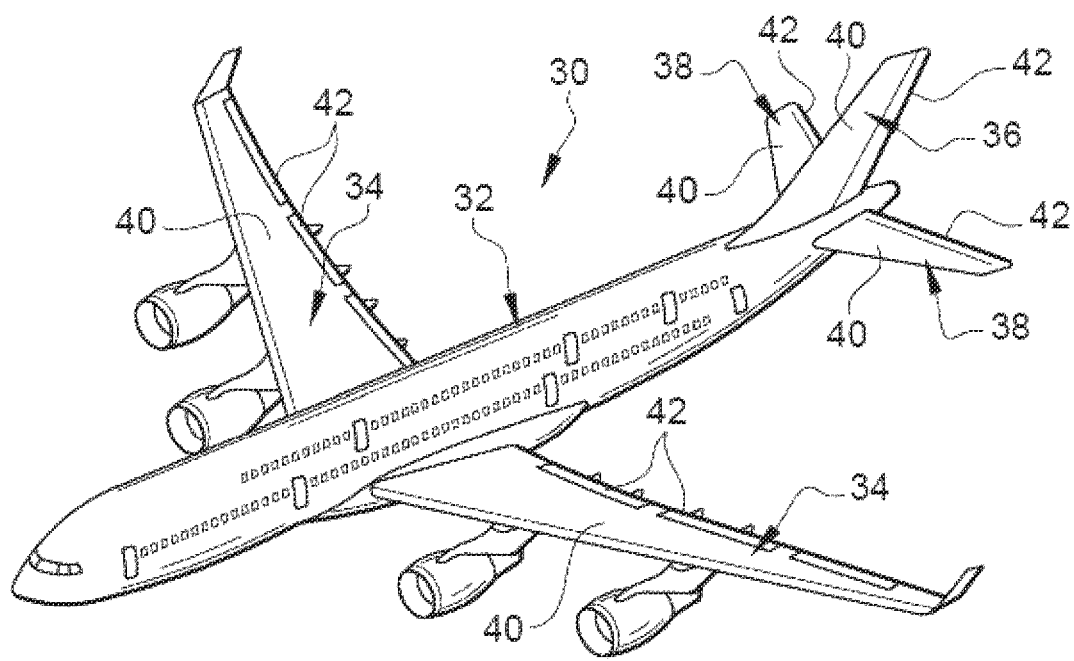

[Fig. 3]
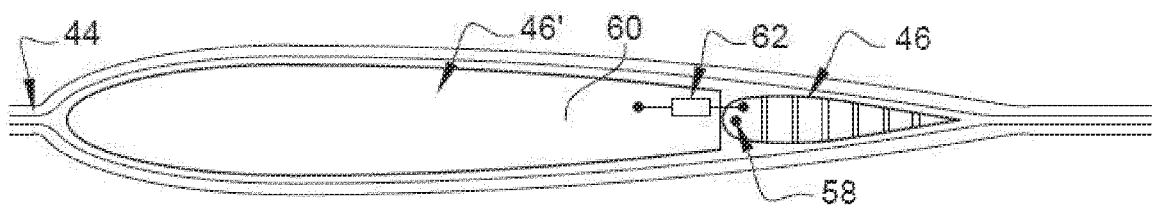

[Fig. 4]
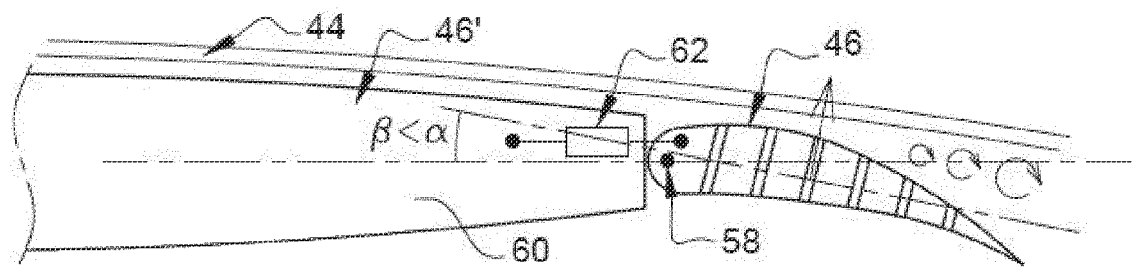

[Fig. 5]
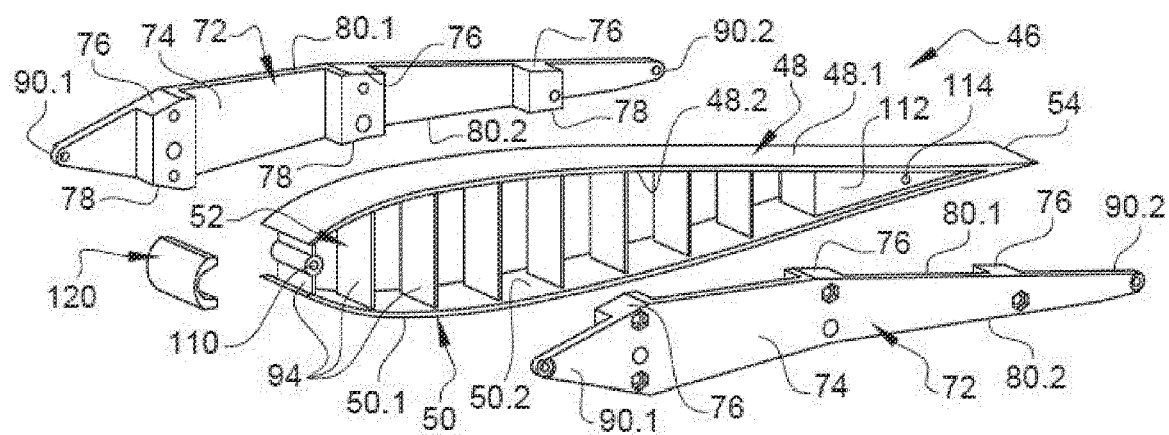

[Fig. 6]
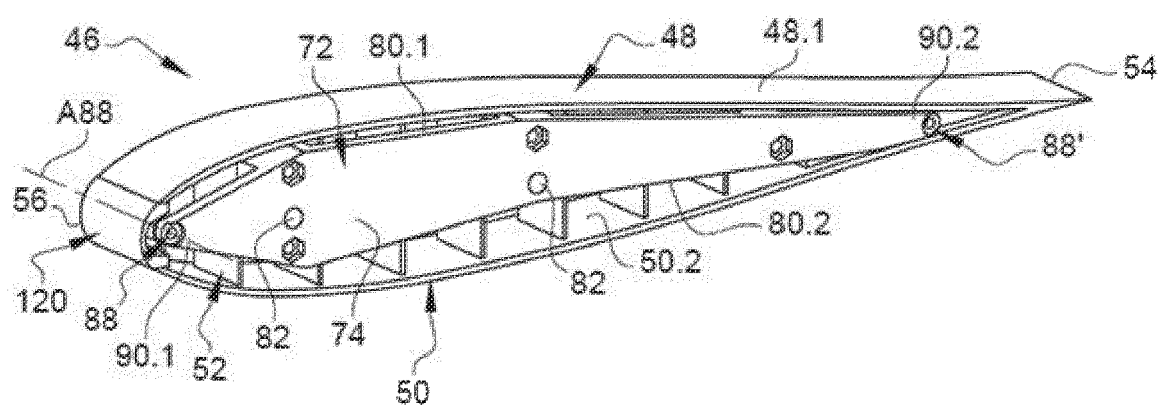

[Fig. 7]
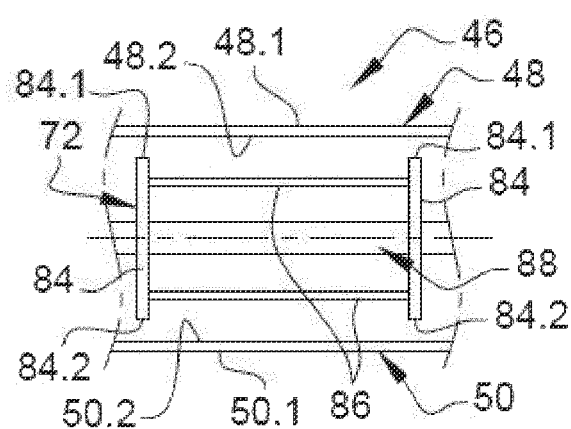

[Fig. 8]
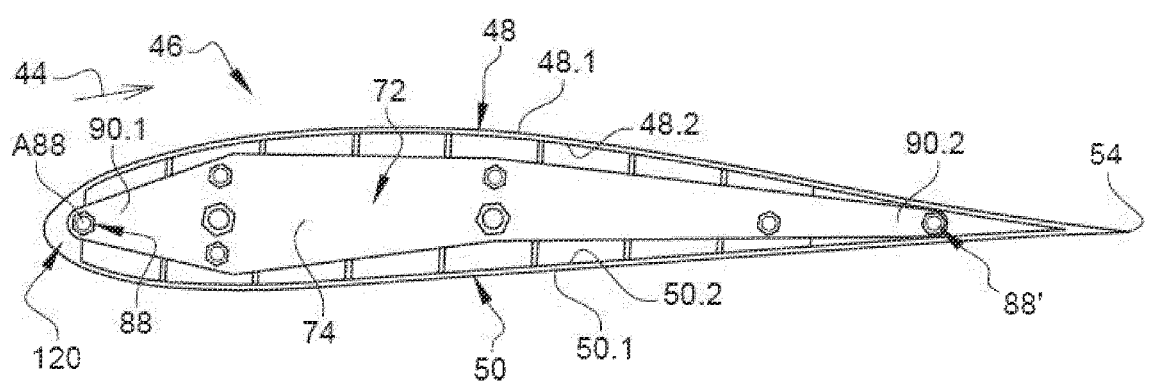

[Fig. 9]
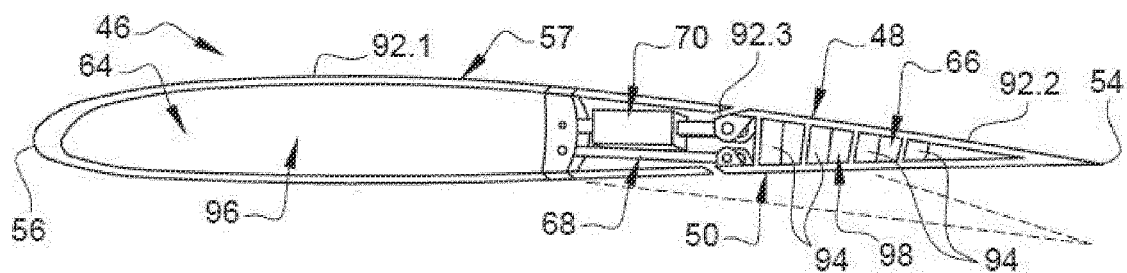
[Fig. 9a]
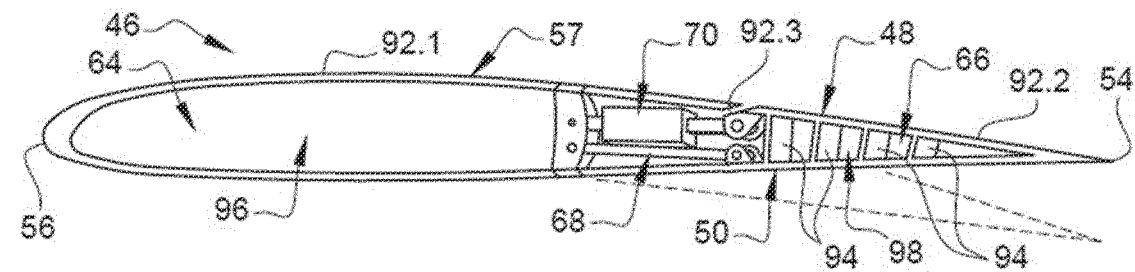

[Fig. 10]
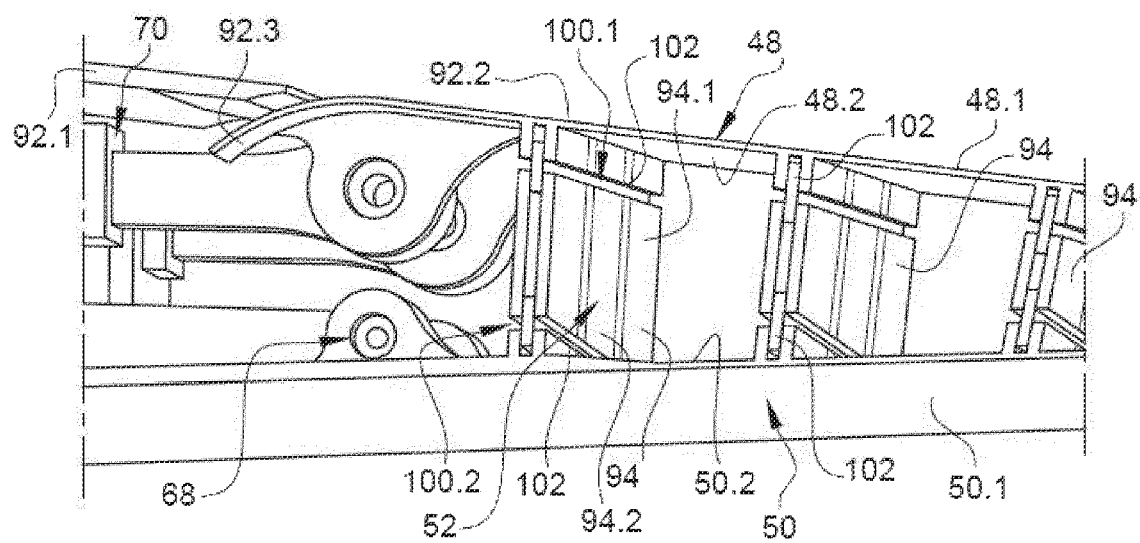

[Fig. 11]
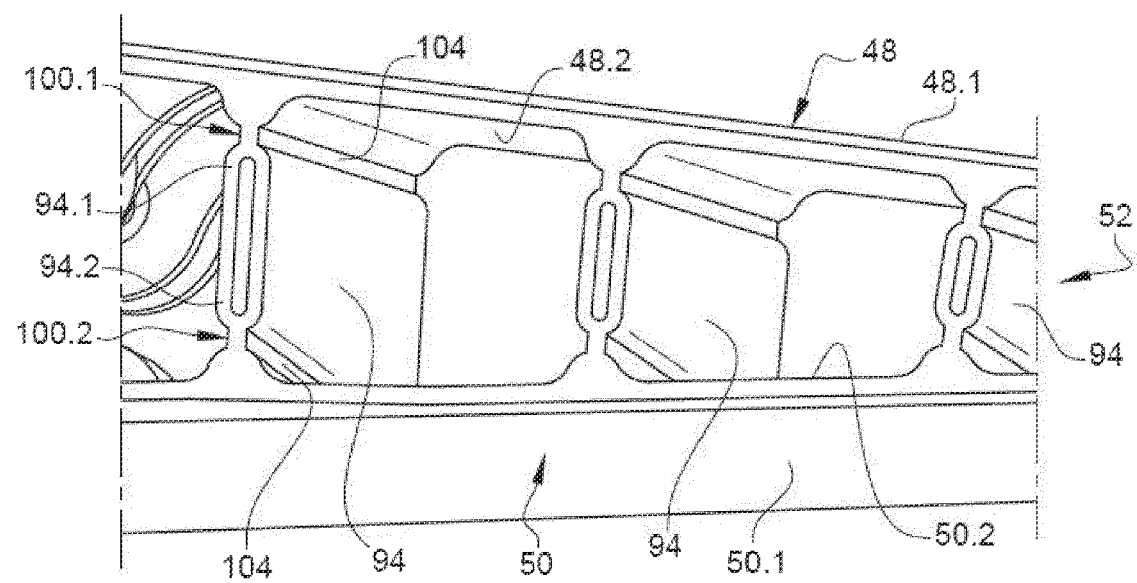

[Fig. 12]
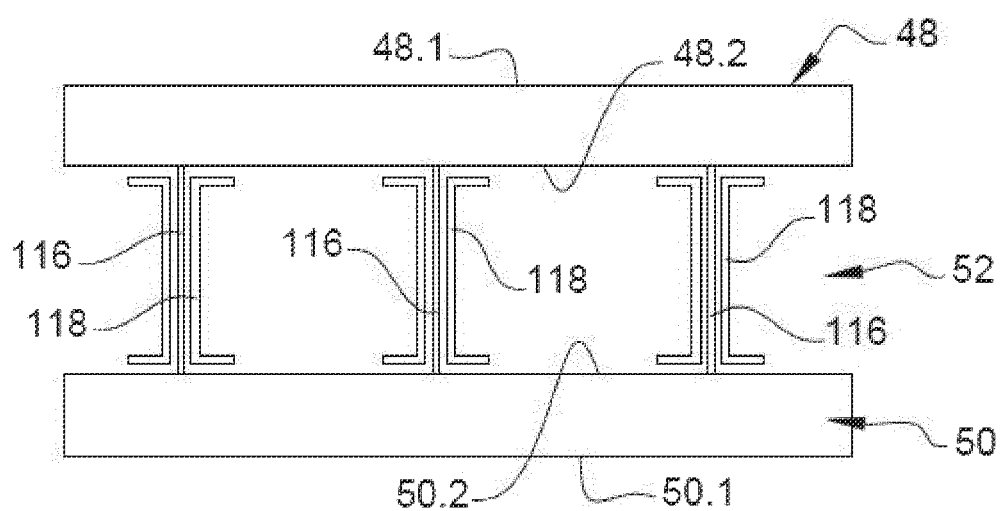

[Fig. 13]
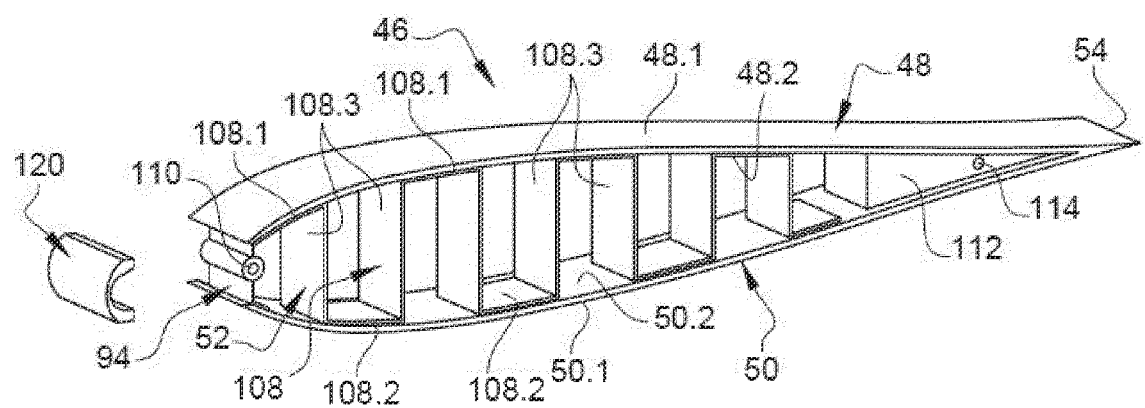

[Fig. 14]
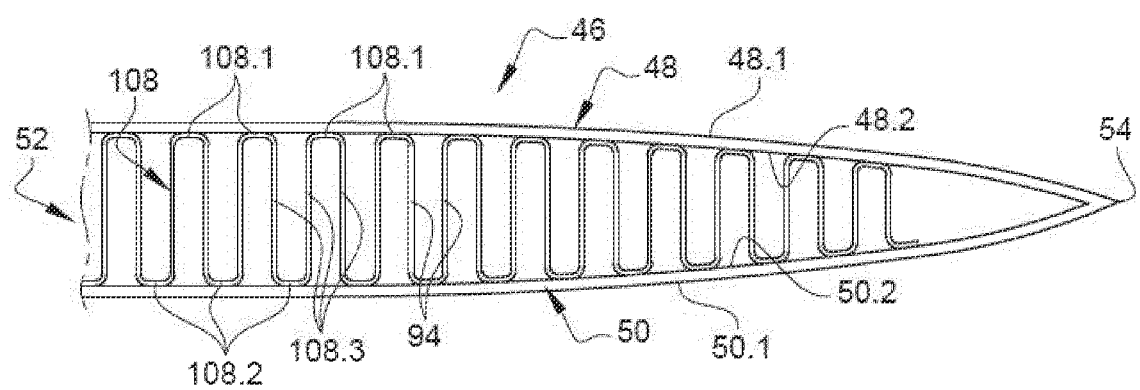

SUPPORTING STRUCTURE WITH PASSIVELY ADAPTABLE PROFILE

The present application relates to a lifting structure with a passively adaptable profile.

According to a known embodiment illustrated in FIG. 1, a lifting structure 10 positioned in a fluid flow comprises a first wall 12 in contact with the fluid flow, a second wall 14 in contact with the fluid flow, a framework 16 connecting the first and second walls 12 and 14, the latter being connected upstream at a leading edge 18 and downstream at a trailing edge 20.

The framework 16 comprises several segments 22.1 to 22.7, set end to end from the leading edge 18 to the trailing edge 20, connected two by two by hinges 24 each having a pivoting axis substantially parallel to the leading or trailing edges 18, 20. Thus, each first segment positioned downstream of a second segment can pivot freely relative to the second segment around the pivoting axis which connects them, in both pivoting directions. In addition, the lifting structure 10 comprises several actuators 26 to control the pivoting movements of the segments 22.1 to 22.7 relative to one another and thus modify the profile of the lifting structure 10. Each actuator 26 is double-acting and allows controlling the pivoting movements of the segments 22.1 to 22.7 relative to one another, in both pivoting directions.

According to one mode of operation, each actuator 26 is actively controlled by a control system in order to control the movements of the different segments 22.1 to 22.7 and thus modify the curvature of the lifting structure 10 to a desired profile.

This embodiment is not fully satisfactory, because it is relatively difficult to determine the most suitable profile of the lifting structure 10 depending on its orientation in the fluid flow. Another difficulty is that the different actuators 26 induce a significant increase in on-board mass when the lifting structure 10 is part of an aircraft. Finally, the actuators and the control system tend to increase the cost of manufacturing and maintenance of the lifting structure 10.

The present invention seeks to correct all or part of the disadvantages of the prior art.

To this end, the invention has as its object a lifting structure positioned in a fluid flow, the lifting structure including a first wall which has a first outer surface in contact with the fluid flow and a first inner surface opposite to the first outer surface, a second wall which has a second outer surface in contact with the fluid flow and a second inner surface opposite to the second outer surface, a framework connecting the first and second walls, the first and second outer surfaces joining at a trailing edge located downstream of said first and second walls, the lifting structure being configured to occupy a first state or a second state different from the first state.

According to the invention, the lifting structure is configured to deform elastically, over at least a part of the lifting structure, between the first state in the absence of external stress and the second state in the presence of external stress induced by the fluid flow due to a change of orientation of the lifting structure and/or of the fluid flow.

According to a first advantage, a change in the profile of the lifting structure is obtained passively, without an actuator. The profile of the lifting structure is adapted, autonomously and automatically, depending on the orientation of the lifting structure and/or of the fluid flow, without the intervention of a complex control system.

According to another feature, the lifting structure is configured to deform elastically between the first state and a maximum deformation state, and it comprises at least one stop system for preventing the deformation of said lifting structure beyond the maximum deformation state.

According to another feature, the lifting structure comprises at least one pivoting connection, having a pivoting axis parallel to a longitudinal direction approximately parallel to the trailing edge, connecting the stop system and the framework According to another feature, the stop system has an elongated shape and includes an upstream end positioned in proximity to a leading edge of the lifting structure and a downstream end positioned in proximity to the trailing edge.

In addition, the lifting structure comprises a first pivoting connection, connecting the stop system and the framework, positioned in proximity to the upstream end of the stop system and to the leading edge of the lifting structure as well as a second pivoting connection, connecting the stop system and the framework, positioned in proximity to the downstream end of the stop system and to the trailing edge of the lifting structure.

According to a first embodiment, each stop system comprises at least one support supporting the first stops, configured to be supported against the first inner surface of the first wall when the lifting structure is in the maximum deformation state, and second stops configured to be supported against the second inner surface of the second wall when the lifting structure is in the maximum deformation state.

According to a second embodiment, each stop system comprises at least one plate having a first edge and a second edge, each plate being configured so that the first and second edges are in contact respectively with the first and second inner surfaces of the first and second walls when the lifting surface is in the maximum deformation state.

According to another feature, the framework comprises several stringers, connecting the first and second walls, spaced apart from upstream to downstream.

According to one embodiment, the framework comprises a core, having a corrugated profile in a transverse plane, which comprises first peaks connected to the first wall, second peaks connected to the second wall as well as intermediate portions, located between the first and second peaks, which form the stringers.

According to another embodiment, each stringer comprises a first edges connected by a first hinge to the first wall and a second edge connected by a second hinge to the second wall, each of the first and second hinges being configured to allow each of the stringers to pivot relative to the first or second wall along a pivoting axis parallel to a longitudinal direction approximately parallel to the trailing edge.

According to another feature, the lifting structure comprises a front part, distinct from the first and second walls and connecting them at a leading edge of the lifting structure, in a more deformable material than the first and second walls and/or than the framework.

The invention also has as its object an aircraft including at least one lifting structure according to one of the preceding features.

Other features and advantages will be revealed by the description that follows, a description given solely by way of an example, with reference to the appended drawings of which:

FIG. 1 is a transverse section of a lifting structure which illustrates an embodiment of the prior art, FIG. 2 is a perspective view of an aircraft, FIG. 3 is a transverse section of a wing, including a lifting structure in a first state, which illustrates an embodiment of the invention, FIG. 4 is a transverse section of the lifting structure, visible in FIG. 3, in a second state, FIG. 5 is an exploded perspective view of a lifting structure which illustrates one embodiment of the invention, FIG. 6 is a perspective view of the lifting structure visible in FIG. 5 in a non-deformed state, FIG. 7 is a section of a stop system of a lifting structure which illustrates another embodiment of the invention, FIG. 8 is a side view of the lifting structure visible in FIG. 6 in a deformed state, FIG. 9 is a transverse section of a wing including a lifting structure which illustrates one embodiment of the invention, FIG. 9a is a transverse section of a wing including a lifting structure which illustrates another embodiment of the invention, FIG. 10 is a section of a framework of a lifting structure which illustrates one embodiment of the invention, FIG. 11 is a section of a framework of a lifting structure which illustrates another embodiment of the invention, FIG. 12 is a section of a framework of a lifting structure which illustrates another embodiment of the invention, FIG. 13 is a perspective view of a lifting structure which illustrates one embodiment of the invention, and FIG. 14 is a schematic view of a part of a lifting structure which illustrates one embodiment of the invention.

In FIG. 2 is shown an aircraft 30 which comprises a fuselage 32, wings 34 located on either side of the fuselage 32, a vertical fin 36 positioned at the rear of the fuselage 32 as well as two horizontal fins 38 located on either side of the vertical fin 36.

According to one embodiment visible in FIGS. 2, 3 and 4, the wings 34, the horizontal fins 38 and the vertical fin 36 each comprise a fixed part 40 and at least one movable part 42, (called a flap or a rudder as the case may be), positioned in the continuation of the fixed part 40.

In flight, the fixed part 40 and the movable part 42 are positioned within an air flow 44. The fixed part 40 and the movable part 42 form two distinct lifting structures 46, 46' (as illustrated in FIGS. 3 and 4) or the fixed part 40 and that movable part 42 form a single lifting structure 46 (as illustrated in FIG. 9).

Although it is described applied to an aircraft, the invention is not limited to the aeronautical field. Thus, it can be applied to any lifting structure positioned in a fluid flow (air, water or other), such as for example a vessel, a sail or a lifting wing of a boat.

For the rest of the description, the terms upstream/downstream or front/rear refer to the direction of flow of the air flow 44, or more generally to the flow of fluid, the latter flowing from upstream to downstream or from the front to the rear.

As illustrated in FIGS. 5 to 8, a lifting structure 46 comprises a first wall 48 which has a first outer surface 48.1 in contact with the air flow 44 and a first inner surface 48.2 opposite to the first outer surface 48.1, a second wall 50 which has a second outer surface 50.1 in contact with the air flow 44 and a second inner surface 50.2 opposite to the second outer surface 50.1, a framework 52 connecting the first and second walls 48, 50, the first and second outer surface 48.1, 50.1 joining at trailing edges located downstream of said first and second walls 48, 50. The first and second outer surfaces 48.1, 50.1 can also join at a leading edge 56 located upstream of said first and second walls 48, 50.

For the rest of the description, a longitudinal direction is approximately parallel to the trailing edge 54, a transverse plane is perpendicular to the trailing edge 54 and a longitudinal plane is a plane perpendicular to a transverse plane or to the trailing edge 54.

The lifting structure 46 has, in a given transverse plane, a profile 57 which corresponds to the intersection of said first and second outer surfaces 48.1, 50.1 and of the given transverse plane.

The lifting structure 46 is configured to occupy a first state (generally called the resting state) and to have a first profile (also called the non-deformed profile), visible in FIG. 3, or a second stated (also called the deformed state) different from the first state, and having a second profile (also called a deformed profile) different from the first profile, visible in FIG. 4.

The lifting structure 46 occupies, relative to the air flow 44, a first orientation in the first state and a second orientation in the second state.

According to a special feature of the invention, the lifting structure 46 is configured to deform elastically, over at least one part, between the first state in the absence of external stress and the second state in the presence of external stress induced by the air flow 44 due to a change of orientation of the lifting structure 46 and/or of the air flow 44.

The change of orientation can arise from a change of orientation of the air flow 44, from a change of orientation of the lifting structure 46, as illustrated in FIG. 4, or from a change of orientation of a part of the lifting structure 46, as illustrated in FIG. 9.

According to a first configuration visible in FIG. 3, the lifting structure 46 is connected by a hinge 58 to a fixed part 60, which can be another lifting structure 46') located upstream of the lifting structure 46 and the change of orientation of the lifting structure 46 is generated by an actuator 62 connecting the fixed part 60 and the lifting structure 46.

According to a second configuration visible in FIG. 9, the lifting structure 46 comprises a front fixed part 64 and a movable rear part 66 connected to the front fixed part 64 by a hinge 68, the change of orientation being generated by an actuator 70 interleaved between the front fixed part 64 and the movable rear part 66.

The lifting structure 46 is configured to deform elastically, over at least one part, between the first state and a maximum deformation state visible in FIG. 8, in which the lifting structure 46 has a maximum curvature. This maximum curvature is determined depending in particular on the mechanical resistance of the lifting structure 46. The lifting structure 46 can occupy the different intermediate states between the first state and the maximum deformation state depending on the stresses induced by the air flow 44.

The lifting structure 46 comprises at least one stop system 72 to prevent the deformation of said lifting structure 46 beyond the maximum deformation state.

According to a first embodiment visible in FIGS. 5 and 6, the stop system 72 comprises at least one support 74 supporting first stops 76 configured to be supported against the first inner surface 48.2 of the first wall 48 when the lifting structure 46 is in the maximum deformation state and second stops 78 configured to be supported against the second inner surface 50.2 of the second wall 50 when the lifting structure 46 is in the maximum deformation state.

According to this first embodiment, the support 74 appears in the form of a plate positioned in a transverse plane, said plate comprising a first edge 80.1 at which are positioned the first stops 76 and a second edge 80.2 at which are positioned the second stops 78. According to this embodiment, the first and second stops 76, 78 are positioned so as not to interfere with the framework 52 during the changes of state of the lifting structure 46. The first and second stops 76, 78 are also distributed over the entire width (distance taken in a transverse plane) of the deformable part of the lifting structure 46.

According to this first embodiment, each support 74 can be offset relative to the first and second walls 48, 50 so as not to interfere with the latter during a change of state of the lifting structure 46. As a variant, the first and second edges 80.1, 80.2 are positioned relative to the first and second stops 76, 78 so as not to be in contact with the first and second inner surfaces 48.2, 50.2 when the lifting structure 46 is in the maximum deformation state or so as to be in contact with the first and second inner surfaces 48.2, 50.2 simultaneously with the first and second stops 76,78 when the lifting structure 46 is in the state of maximum deformation.

According to this first embodiment, the stop system 72 comprises several supports 74, each supporting first and second stops 76, 78, connected together to stiffen them. Thus, the lifting structure 46 comprises connections 82 connecting the supports 74 together. These connections 82 are positioned so as not to interfere with the framework 52 during changes of state of the lifting structure 46.

According to a second embodiment visible in FIG. 7, the stop system 72 comprises at least one plate 84, positioned in a transverse plane, having a first edge 84.1 and a second edge 84.2, each plate 84 being configured so that the first and second edges 84.1 and 84.2 are in contact respectively with the first and second inner surfaces 48.2, 50.2 when the lifting structure 46 is in the maximum deformation state.

According to this second embodiment, the stop system 72 comprises several plates 84 connected together to stiffen them. Thus, the lifting structure 46 comprises connections 86 connecting the plates 84 together. These connections 86 are positioned so as not to interfere with the framework 52 during changes of state of the lifting structure 46.

The stop system 72 is connected to the framework 52 by at least one pivoting connection 88 having a pivoting axis A88 parallel to the longitudinal direction. The stop system 72 has an elongated shape and includes an upstream end 90.1 positioned in proximity to the leading edge 56 and a downstream end 90.2 positioned in proximity to the trailing edge 54. According to a first configuration, the stop system 72 is connected to the framework 52 by a pivoting connection 88 positioned in proximity to its upstream end 90.1. According to a second configuration visible in FIGS. 6 and 8, the stop system 72 is connected to the framework 52 by a first pivoting connection 88 positioned in proximity to its upstream end 90.1 and to the leading edge 56 as well as by a second pivoting connection 88' positioned in proximity to its downstream end 90.2 and to the trailing edge 54. This second configuration allows the stop system 72 to follow the orientation of the lifting structure 46 during its change of state.

In FIGS. 5 to 9, the first stops 76 are positioned or the first edge 80.1 is configured so that the first wall 48 follows a convex curvature corresponding to the curvature of the profile 57 of the lifting structure 46 in the maximum deformation state. In parallel, the second stops 78 are positioned or the second edge 80.2 is configured so that the second wall 50 follows a concave curvature corresponding to the curvature of the profile 57 of the lifting structure 46 in the maximum deformation state. Of course, the invention is not limited to these curvatures. Thus, the first and second stops 76,78 could be positioned or the first and second edges 80.1, 80.2 could be configured so that the first and second walls 48, 50 each follow one or more concave and/or convex curvatures in the maximum deformation state.

The first and second walls 48, 50, as well as the framework 52, are configured to deform elastically, at least over certain of their parts, so as to occupy the different states.

According to a first embodiment visible in FIG. 8, the first wall 48 can be continuous from the leading edge 56 to the trailing edge 54. According to another embodiment visible in FIG. 9, the first wall 48 can comprise several dissociated parts, distributed from upstream to downstream. Thus, the first wall 48 can comprise a fixed upstream part 92.1 and a movable downstream part 92.2 comprising an upstream strip of matter 92.3 dimensioned so as to ensure the continuity of the outer surface between the fixed upstream part 92.1 and the movable downstream part 92.2 when the lifting structure 46 occupies the maximum deformation state.

Like the first wall 48, the second wall 50 can be continuous or comprise several dissociated parts from the leading edge 56 until the trailing edge 54. For example, as illustrated in FIG. 9a, the first wall 48 can comprise several disassociated parts while the second wall 50 can be continuous from the leading edge 56 until the trailing edge 54. In another example (not shown), the first wall 48 can be continuous from the leading edge 56 until the trailing edge 54 while the second wall 50 can comprise several disassociated parts.

The first and second walls 48, 50 can be metallic or of composite material or of any other material allowing them to deform. Moreover, in one particular implementation, the first and second walls 48, 50 can be made in a single piece in a single material which can be of the composite type or of the type allowing them to deform.

According to a first embodiment visible in FIGS. 3 to 8, the framework 52 is deformable from the leading edge 56 to the trailing edge 54 and comprises several stringers 94 connecting the first and second walls 48, 50 and spaced apart from upstream to the front. According to one configuration, each stringer 94 is positioned in a longitudinal plane and extends over the entire length of the lifting structure 46 (dimension taken in a longitudinal plane). In one particular implementation, not limited to the first embodiment, the stringers 94 have the shape of a parallelogram in the resting state of the lifting structure 46 and have an "S" shape allowing bending of their ends in the deformed state of the lifting structure 46. For example, the stringers 94 can be of composite material such as carbon fiber-epoxy composite.

According to a second embodiment visible in FIG. 9, the framework 52 comprises a first rigid upstream part 96 and a second downstream deformable part 98 which comprises several stringers 94 connecting the first and second walls 48, 50 and spaced apart from upstream to the front. According to one configuration, each stringer 94 is positioned in a longitudinal plane.

According to one embodiment visible in FIGS. 10 and 11, each stringer 94 comprises a first edge 94.1 connected by a first hinge 100.1 to the first wall 48 and a second edge 94.2 connected by a second hinge 100.2 to the second wall 50. Each of the first and second hinges 100.1, 100.2 is pivoted relative to the first or second wall 48, 50 along a pivoting axis parallel to the longitudinal direction.

According to a first variant illustrated in FIG. 10, each of the first and second hinges 100.1, 100.2 comprises a flexible clip 102 having a first edge housed in a groove provided at the first edge 94.1 of the stringer 94 and a second edge housed in a groove integral with the first or second wall 48, 50.

According to a second variant illustrated by FIG. 11, each of the first and second hinges 100.1, 100.2 comprises a thickness reduction 104 of the stringer 94.

According to another embodiment, the framework 52 comprises a core 108 having a corrugated profile in a transverse plane which comprises first peaks 108.1 connected to the first wall 48, second peaks 108.2 connected to the second wall 50 as well as intermediate portions 108.3, located between the first and second peaks 108.1, 108.2 which form the stringers 94.

The intermediate portions 108.3 can be flat or curved. The first and second peaks 108.1, 108.2 can be curved, as illustrated in FIG. 14, or flat as illustrated in FIG. 13. The core 108 can have a length substantially equal to that of the first and second walls 48, 50.

The core 108 can be metallic or of composite material. It can be obtained by means of different methods, such as for example a filament laying method. Moreover, in one particular implementation, the core 108 can be produced in a single piece in a single material, which can be of the metallic type, of the composite type or of extruded plastic material.

According to one embodiment visible in FIGS. 5 and 13, the stringer 94 located farthest upstream comprises a bore 110 oriented parallel to the longitudinal direction, configured to house a shaft integral with the stop system 72. The framework 52 also comprises a wedge 112 configured to fill in the space between the first and second walls 48, 50 at the trailing edge 54, which has a recess 114 oriented parallel to the longitudinal direction configured to house a shaft integral with the stop system 72.

According to another embodiment visible in FIG. 12, the framework 52 can comprise, instead of or in addition to the stringers 94, a plurality of slender and flexible links 116 each connecting the first and second walls 48, 50, and for each link 116 a spacer 118, fitted around the link 116, holding the first and second walls 48, 50 separated. In a particular embodiment of this example, the lifting structure 46 can be inflatable. In this case, the first and second walls 48, 50 and the links 116 can be formed from three-dimensional fabric, otherwise called double wall fabric or "drop stitch" fabric (an expression regarding a fabric technique with drop points or patterns with fallen stitches). In this implementation, the links 116 and the first and second walls 48, 50 are configured to resist a predetermined inflation pressure.

Naturally, the invention is not limited to the embodiments previously described for the framework 52.

According to an embodiment visible in FIGS. 5, 6 and 13, the lifting structure 46 comprises a front part 120 positioned at the leading edge 56, distinct from the first and second walls 48, 50, connecting them, of a more deformable material than the first and second walls 48, 50 and/or than the framework 52. By way of an example, the front part 120 is of elastomer. This configuration allows limiting the stiffness of the upstream part of the lifting structure 46.

The principle of operation of the lifting structure 46 is now described with reference to FIGS. 3 and 4.

When the air flow 44 exerts no stress on the lifting structure 46 or exerts substantially identical stresses on the first and second walls 48, 50, the lifting structure 46 occupies a first, resting state, as illustrated in FIG. 3. The first and second walls 48, 50 and the framework 52 are not deformed elastically.

When the orientation of the air flow 44 and/or of the lifting structure 46 is modified, as illustrated in FIG. 4, the air flow 44 exerts different external stresses on the first and second walls 48, 50. These external stresses cause elastic deformation of the lifting structure and a passive (with no actuator) change in its profile 57. This change of profile 57 depends on the external stresses exerted by the air flow 44 and its curvature adapts itself automatically to these external stresses. Thus, the lifting structure 46 autonomously (with no control system) has a profile adapted to the air flow 44.

When the external stresses of the air flow 44 exceed a given threshold, the profile 57 no longer evolves, the first and second walls 48, 40 and/or the framework 52 being blocked by the stop system 72.

Due to its elastic properties, the lifting structure 46 returns to the first state when the air flow 44 no longer exerts stresses on the lifting structure 46 or exerts substantially identical stresses on the first and second walls 48, 50 as illustrated in FIG. 3.

As the lifting structure 46 has a profile which adapts depending on its orientation relative to the air flow 44, it allows increasing the lift and reducing the aerodynamic drag.

The invention claimed is:

1. A lifting structure positioned in a fluid flow, the lifting structure including a first wall which has a first outer surface in contact with the fluid flow and a first inner surface opposite to the first outer surface, a second wall which has a second outer surface in contact with the fluid flow and a second inner surface opposite to the second outer surface, a framework, the framework comprising a plurality of stringers, connecting the first and second walls and being spaced between the first and second walls from upstream to downstream, the first and second outer surfaces joining at a trailing edge located downstream of said first and second walls, the first and second walls and the framework being configured to occupy a first state or a second state different from the first state, and wherein the first and second walls and the framework are configured to passively deform elastically, over at least a downstream part of the lifting structure that extends to the trailing edge, between the first state in the absence of external stress and the second state in the presence of external stress induced by the fluid flow due to a change of orientation of the lifting structure and/or of the fluid flow.

2. The lifting structure according to claim 1, wherein the first and second walls and the framework are configured to deform elastically between the first state and a maximum deformation state, and wherein the lifting structure comprises a stop system to prevent deformation of said first and second walls and framework beyond the maximum deformation state.

3. The lifting structure according to claim 2, wherein the stop system comprises a support supporting first stops configured to be supported against the first inner surface of the first wall when the first and second walls and the framework are in the maximum deformation state and second stops configured to be supported against the second inner surface of the second wall when the first and second walls and the framework are in the maximum deformation state.

4. The lifting structure according to claim 2, wherein the stop system comprises at least one plate having a first edge and a second edge, each said plate being configured so that the first and second edges are in contact respectively with the first and second inner surfaces of the first and second walls when the first and second walls and the framework are in the maximum deformation state.

5. The lifting structure according to claim 1, wherein the framework comprises a core, having a profile corrugated in a transverse plane which comprises first peaks connected to the first wall, second peaks connected to the second wall, as well as intermediate portions located between the first and second peaks which form the plurality of stringers.

6. The lifting structure according to claim 1, wherein each said stringer comprises a first edge connected by a first hinge to the first wall and a second edge connected by a second hinge to the second wall, each of the first and second hinges being configured to allow each of the stringers to pivot relative to the first or second wall along a pivoting axis parallel to a longitudinal direction approximately parallel to the trailing edge.

7. The lifting structure according to claim 1, wherein the lifting structure comprises a front part, distinct from the first and second walls, connecting them at the leading edge of the lifting structure, of a more deformable material than the first and second walls and/or than the framework.

8. The lifting structure according to claim 7, wherein the stringers are formed from three-dimensional fabric.

9. The lifting structure according to claim 8, wherein the framework additionally includes flexible links connecting the first and second walls spaced apart from upstream to downstream, and in that the links are formed from three-dimensional fabric.

10. The lifting structure according to claim 1, wherein the lifting structure is inflatable.

11. The lifting structure according to claim 1, wherein the first and second walls and the framework are configured to pass into one or more different intermediate states between the first state and a maximum deformation state, depending on the external stresses induced by the fluid flow due to the change of orientation of the lifting structure and/or of the fluid flow.

12. A lifting structure positioned in a fluid flow, the lifting structure including a first wall which has a first outer surface in contact with the fluid flow and a first inner surface opposite to the first outer surface, a second wall which has a second outer surface in contact with the fluid flow and a second inner surface opposite to the second outer surface, a framework connecting the first and second walls, the first and second outer surfaces joining at a trailing edge located downstream of said first and second walls, the first and second walls and the framework being configured to occupy a first state or a second state different from the first state, and wherein the first and second walls and the framework are configured to passively deform elastically, over at least a downstream part of the lifting structure that extends to the trailing edge, between the first state in the absence of external stress and the second state in the presence of external stress induced by the fluid flow due to a change of orientation of the lifting structure and/or of the fluid flow, wherein the first and second walls and the framework are configured to deform elastically between the first state and a maximum deformation state, and wherein the lifting structure comprises a stop system to prevent deformation of said first and second walls and framework beyond the maximum deformation state, and wherein the lifting structure comprises at least one pivoting connection having a pivoting axis parallel to a longitudinal direction approximately parallel to the trailing edge connecting the stop system and the framework.

13. The lifting structure according to the claim 12, wherein the stop system has an elongated shape and includes an upstream end positioned in proximity to a leading edge of the lifting structure and a downstream end positioned in proximity to the trailing edge, and wherein the lifting structure comprises a first said pivoting connection, connecting the stop system and the framework, positioned in proximity to the upstream end of the stop system and to the leading edge of the lifting structure as well as a second said pivoting connection, connecting the stop system and the framework, positioned in proximity to the downstream end of the stop system and to the trailing edge of the lifting structure.

14. An aircraft including at least one lifting structure according to claim 1.

15. A vessel including at least one lifting structure according to claim 1.

16. A lifting structure positioned in a fluid flow, the lifting structure including a first wall which has a first outer surface in contact with the fluid flow and a first inner surface opposite to the first outer surface, a second wall which has a second outer surface in contact with the fluid flow and a second inner surface opposite to the second outer surface, a framework connecting the first and second walls, the first and second outer surfaces joining at a trailing edge located downstream of said first and second walls, the first and second walls and the framework being configured to occupy a first state or a second state different from the first state, and wherein the first and second walls and the framework are configured to passively deform elastically, over at least a downstream part of the lifting structure that extends to the trailing edge, between the first state in the absence of external stress and the second state in the presence of external stress induced by the fluid flow due to a change of orientation of the lifting structure and/or of the fluid flow, wherein the lifting structure comprises a front part, distinct from the first and second walls, connecting them at the leading edge of the lifting structure, of a more deformable material than the first and second walls and/or than the framework, and wherein the framework includes flexible links connecting the first and second walls spaced apart from upstream to downstream, and in that the first and second walls and the links are formed from three-dimensional fabric.

\* \* \* \* \*